United States Patent [19]

Bonetti

[11] Patent Number: 5,170,993
[45] Date of Patent: Dec. 15, 1992

[54] BALL VALVE FOR FLUIDS WITH SEATS COMPRISING LAMINATED RINGS

[75] Inventor: Giulio Bonetti, Milan, Italy

[73] Assignee: Cesare Bonetti S.p.A., Garbagnate Milanese, Italy

[21] Appl. No.: 792,355

[22] Filed: Nov. 14, 1991

[30] Foreign Application Priority Data

Jan. 30, 1991 [IT] Italy ............................. 91 A000216

[51] Int. Cl.⁵ .............................................. F16K 5/06
[52] U.S. Cl. .................................. 251/368; 251/361
[58] Field of Search .............. 251/368, 315, 359, 360, 251/361

[56] References Cited

U.S. PATENT DOCUMENTS

| 556,037 | 3/1896 | Weiss | 251/368 |
|---|---|---|---|
| 1,246,787 | 11/1917 | Rosner | 251/368 |
| 2,369,025 | 2/1945 | Cummings | 251/368 |
| 3,863,889 | 2/1975 | Robinson et al. | 251/368 |
| 4,006,881 | 2/1977 | Gaillard | 251/368 |
| 4,269,391 | 5/1981 | Saito et al. | 251/368 |
| 4,936,546 | 6/1990 | Berchem | 251/368 |

*Primary Examiner*—A. Michael Chambers
*Attorney, Agent, or Firm*—Herbert Dubno

[57] ABSTRACT

Ball valve for fluids, with sealing seat comprising rings, disposed between the spherical surface of the valve and the interior of the valve body, composed of rings formed of superimposed layers of plates of graphite alternating with plates of stainless steel sheet, the whole being contained in a casing of metal sheet covering the outer sides of the seat, except the one in contact with the spherical sealing surface.

3 Claims, 1 Drawing Sheet

BALL VALVE FOR FLUIDS WITH SEATS COMPRISING LAMINATED RINGS

FIELD OF THE INVENTION

The subject of the present invention is a ball valve for the shutting-off and/or deviation of fluids at high temperatures and pressures, the sealing seat for the ball is composed of ring seatings, each formed both with particular arrangements of laminated elements and with different materials, variously arranged.

BACKGROUND OF THE INVENTION

As is well known, the valves known as "ball" valves are composed of a valve body having a cylindrical cavity, into which lead two or more ducts connected to the supply of fluids to be distributed or intercepted, according to requirements, and of a ball inside the cylindrical cavity having an axial or cruciform duct and capable of being operated from outside. The ball is mounted between the inlet and deliver ducts in such a way as to dispose the axial duct of the ball in alignment with the inlet and delivery ducts or to close one or the other of these ducts, and also to bring into communication with one another the various channels for a specific distribution of the fluid.

The problem that arises in this type ball valves is the ring seats which surround the ball and which must make a seat both between the inlet and outlet ports in both directions and between both the ports and the control shaft leading to the outside.

The seatings are not subject to being compressed between the fixed and movable part, except during initial assembly, for which reason any wear must be avoided which might give rise to play between the parts, which cannot be taken up.

The seats are also subject both to high temperatures, such as those of saturated and superheated steam, and to high differential pressures, while in these conditions also it must be possible to operate them without the need to apply excessive torque.

OBJECTS OF THE INVENTION

It is therefore a principle object of the present invention to provide the valve avoiding the drawbacks of the prior art. Still another object of the invention is to provide a valve seat withstanding hot temperatures and pressures.

SUMMARY OF THE INVENTION

According to the present invention, each seating of the valve is composed of a series of layers of pure graphite plates, reinforced with stainless steel sheet of a few hundredths of a millimeter in thickness, and is contained in an appropriate casing of stainless steel, which may cover the entire seating with the exception of the contact surface with the moving part, or the remaining three sides or only two of them.

Each graphite plate, according to this invention, must be composed of graphite having a density of 1.4 to 2 kg/dm$^3$, preferably from 1.6 to 1.8 kg/dm$^3$, obtained by a pressure of 1.4 to 2 bar.

Instead of the stainless steel, each reinforcing sheet could be of nickel sheet, also of thickness from 0.07 to 0.01 mm.

The aforementioned casing containing the seat may extend over the three sides that are not in contact with the movable part or over only two sides, but in any case with application of a layer of graphite of 0.5 to 1.5 mm thickness, bonded onto the annular surface facing towards the fixed side.

The side of the seating that is in contact with the movable part of the valve according to this invention is preferably inclined and rectilinear, so as to have only a single, circular line of contact with the spherical surface of the movable ball.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
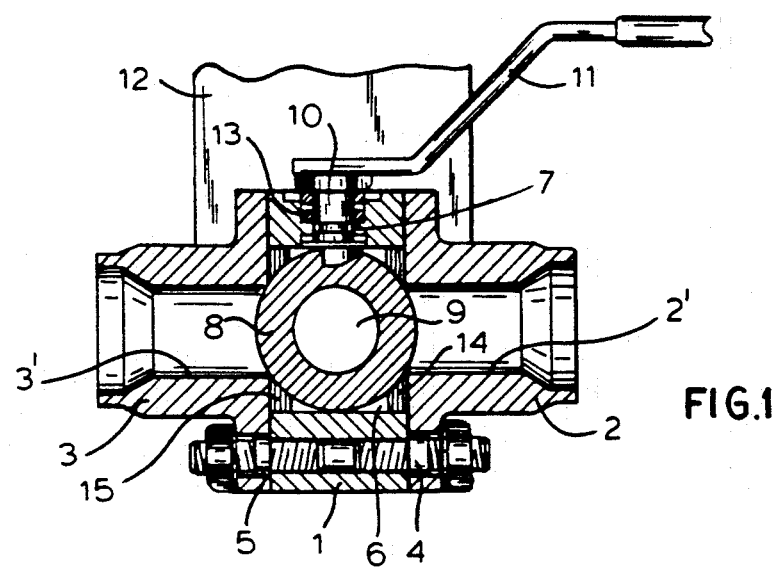
FIG. 1 is the longitudinal section of the valve according to the present invention and shown in the closed position.

The valve is comprised of a central body and two flanged connections 2 and 3, disposed coaxially with the body 1 and connected to it by screws or stud bolts 4 and 5.

The central body 1 has an internal cylindrical cavity 6 disposed in the axial direction and a cylindrical bore 7 perpendicular to the axis.

The flanged connections 2 and 3 each have, inside them, an axial duct 2', 3', such that when the connections are fitted onto the central body 1, the axes of the internal ducts 2' and 3' shall intersect the axis of the cylindrical surface 6 of the central body 1.

Inside the cylindrical surface 6 and on the axis of the ducts 2' and 3', is disposed the ball 8 equipped with a through hole 9 defined by an inner wall 8', the hole when the ball is in position inside the cavity 6, is coaxial with and substantially of the same dimensions as the ducts 2' and 3'.

The rotation of the ball 8 is effected by means of a shaft 10, which can be operated from outside by a hand lever 11 or by motorized means, referenced generally 12.

The drive shaft 10 for the ball 8, housed in the bore 7, is provided with seatings of known ring type or the like 13, disposed along its axis.

The seatings 14, 15, of annular type, disposed with their axes coaxial with the ducts 2' and 3' and blocked between the spherical surface of the ball 8 and the flat surfaces of the flanges of the connections 2 and 3, act on the continuous spherical surface of the ball 8.

The surface of said seatings 14, 15 in contact with the movable part of the ball is composed of the internal conical part, having a rectilinear generatrix, so as to have the sealing contact between said internal conical surface and the spherical surface of the valve solely along a continuous, circular line.

Figure 3:
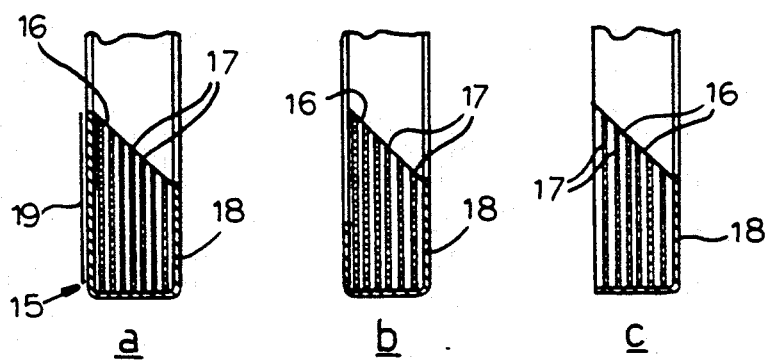
FIGS. 3a, b, c are enlarged cross sections of various embodiments of the seatings according to the invention.

As seen in FIG. 3, the seating 15, according to the embodiment, is composed of a series of parallel layers 16 of sheet metal, of stainless steel, pure nickel or the like, as discussed above, alternating with parallel layers 17 of pure graphite or the like, the whole contained in a sheet metal casing 18, which surrounds the three outer sides of the seating, while the side in contact with the fixed part is covered by a further layer of graphite 19, disposed on the outer surface of the sheet metal.

In FIGS. 3b and 3c there are illustrated, in section, further embodiments of seatings having the same layered composition as the seating indicated at (*a*), but with the outer, containing metal sheet limited on the broader side according to the embodiments illustrated in FIG. 3b, or limited to only the two remaining sides.

Figure 2:
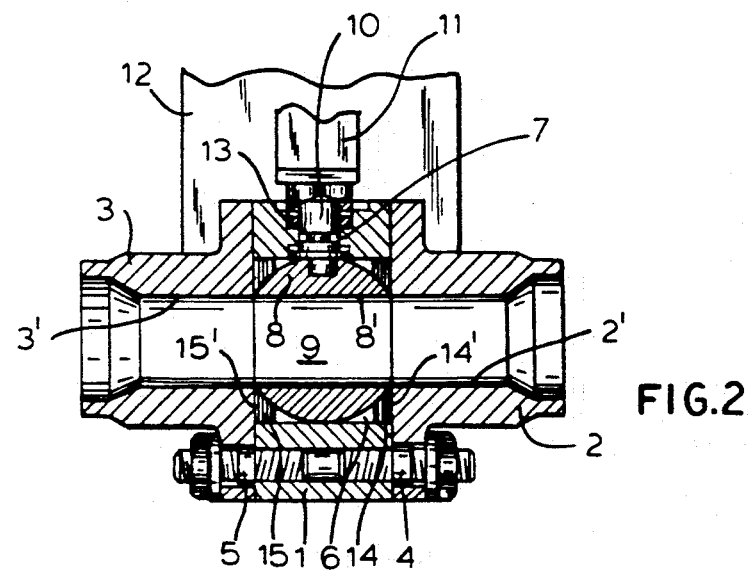
FIG. 2 is the valve according to FIG. 1 but shown in the open position.

As can be clearly seen from FIGS. 1 and 2, the sealing seatings 14, 15 are in contact with the spherical surface of the valve along continuous circular lines, coaxial with the ducts 2' and 3', so that the seal takes place not only between the ducts 2' and 3' but also between these ducts and the space which remains between the cylindrical surface 6 and the spherical surface of the valve.

This prevents residues of fluid passing through from being able to penetrate into the casing of the valve and escape to the outside along the operating shaft of said valve.

It is understood that many variants of a constructional type may be applied to the valve described above, while still keeping the arrangement of the sealing seatings on the ball with the characteristics that form the present invention.

We claim:

1. A valve comprising:
   a valve housing provided with a flow passage, said housing comprising upstream and downstream parts spaced apart along said passage, each of said parts formed with:
   a respective inner annular wall delimiting said passage, and
   a respective annular end face, said annular end face extending radially outwardly from the respective inner wall;
   a valve ball received in said housing along said passage and rotatable about an axis transverse to said flow passage between an open position and a closed position of said valve, said valve ball being formed with:
   an inner bore provided with an inner annular surface flush with said annular inner walls of said flanges and forming a continuous peripheral wall of said passage in said open position of said valve, and
   an outer spherical surface extending outwardly of said inner annular walls of said flange and forming respective widening outwardly gaps with said end faces; and
   annular seats mounted in said gaps, each of said seats comprising:
   a respective metal casing having a side juxtaposed with said end face of the respective flange,
   a plurality of layers of graphite plates, and
   a plurality of layers of hard metal plates alternating with said layers of graphite plates, said pluralities of juxtaposed plates extending transversely to said passage and forming a respective sealing surface shaped complementary to and in contact with said spherical surface.

2. The valve defined in claim 1 wherein said side of the casing juxtaposed with the respective end face is covered with a layer of pure graphite having a thickness from 0.5 to 1.5 mm.

3. The valve defined in claim 1 wherein said sealing surface is formed by a straight line generatrix rotated about the axis along a closed path, so that respective seats and the valve ball contact one another along a respective continuous circular line.

* * * * *